United States Patent [19]

Vitins

[11] Patent Number: 4,545,006
[45] Date of Patent: Oct. 1, 1985

[54] ELECTRONIC CHOPPER CIRCUIT AND A METHOD OF OPERATION

[75] Inventor: Janis Vitins, Wettingen, Switzerland

[73] Assignee: BBC Brown, Boveri & Company, Limited, Baden, Switzerland

[21] Appl. No.: 528,064

[22] Filed: Aug. 31, 1983

[30] Foreign Application Priority Data

Sep. 23, 1982 [EP] European Pat. Off. ........ 82201188.8

[51] Int. Cl.[4] .................. H02H 9/04; H03K 17/292
[52] U.S. Cl. ............................ 363/124; 307/252 M
[58] Field of Search ............ 363/27, 28, 124, 138, 363/35, 57; 323/239, 242, 324, 326, 282, 303, 304; 307/252 M, 252 T; 361/100

[56] References Cited

U.S. PATENT DOCUMENTS

| | | | |
|---|---|---|---|
| 3,198,989 | 8/1965 | Mahoney | 361/100 |
| 3,594,629 | 7/1971 | Kawakami | 363/124 |
| 3,943,430 | 3/1976 | Kumano | 363/124 |
| 3,997,818 | 3/1975 | Bodkin | 361/100 |

FOREIGN PATENT DOCUMENTS

| | | |
|---|---|---|
| 2132380 | 6/1971 | Fed. Rep. of Germany . |
| 875557 | 10/1981 | U.S.S.R. ................ 363/124 |

*Primary Examiner*—Peter S. Wong
*Assistant Examiner*—Judson H. Jones
*Attorney, Agent, or Firm*—Oblon, Fisher, Spivak, McClelland & Maier

[57] ABSTRACT

An autonomous voltage-limiting circuit is created from a chopper circuit by using a first and second breakover circuit and a timing section for driving a main thyristor and a quenching thyristor, which voltage-limiting circuit is distinguished by simplicity and high reliability.

4 Claims, 2 Drawing Figures

ELECTRONIC CHOPPER CIRCUIT AND A METHOD OF OPERATION

BACKGROUND OF THE INVENTION

1. Field of the Invention

The invention relates to an electronic chopper circuit and to a method for operating it.

2. Description of the Prior Art

Such a circuit is known, for example, from the book by F. Zach, Leistungselektronic (Paraelectronics), Springer-Verlag, 1979, page 261. It is used for direct-current chopper converters or choppers for regulating the direct voltage in direct-current voltage changers with intermediate direct-voltage circuits. Essentially, it is composed of a main thyristor and an associated quenching circuit which is constructed as a controllable tuned circuit. As long as the main thyristor is cut off, the quenching capacitor is charged up via the charging diode from the voltage applied to the input. The regulating process begins with the firing of the main thyristor by means of a firing pulse applied to the control gate. The quenching thyristor is cut off at this time and thus prevents the quenching capacitor from being discharged or recharged. The input voltage drives a current through the load resistance via the main thyristor. The regulating process ends with the quenching thyristor firing as a result of a firing pulse being applied to its control gate. The charged quenching capacitor then swings over via the quenching thyristor and the quenching inductance and causes a so-called "soft" quenching in the main thyristor when it swings back.

With a predetermined input voltage, the mean voltage across the load resistance during periodic chopper operation is given by the ratio between on times and duration of the period, i.e., the control ratio. The control ratio is determined by the sequence in time of the firing pulses for the main and the quenching thyristor. The firing pulses, in turn, are generated in an external control logic in accordance with the desired mean output voltage. In order therefore to use the known circuit for limiting the input voltage, elaborate measuring and control electronics are required, which derive from the value of the input voltage applied a firing pulse sequence for the main and quenching thyristors which is suitable for limiting the voltage.

SUMMARY OF THE INVENTION

Accordingly, it is an object of the present invention to provide a simple electronic chopper circuit which can be used, without elaborate external measuring and control electronics, in autonomous operation for limiting a voltage applied to the input.

The objective is achieved in a preferred illustrative embodiment of the invention, wherein breakover circuits are used with each breakover circuit consisting of a breakover diode and a series resistance, and a timing section is constructed as a series circuit of a timing resistance and a timing capacitor. In this manner, the circuit can be constructed in a particularly simple and reliable manner.

In the method for operating the chopper circuit according to the invention, the main thyristor is fired by the first breakover circuit when the input voltage exceeds a predetermined value and, following that, the quenching thyristor is fired by the second breakover circuit after a period of time determined by the timing section and the main thyristor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
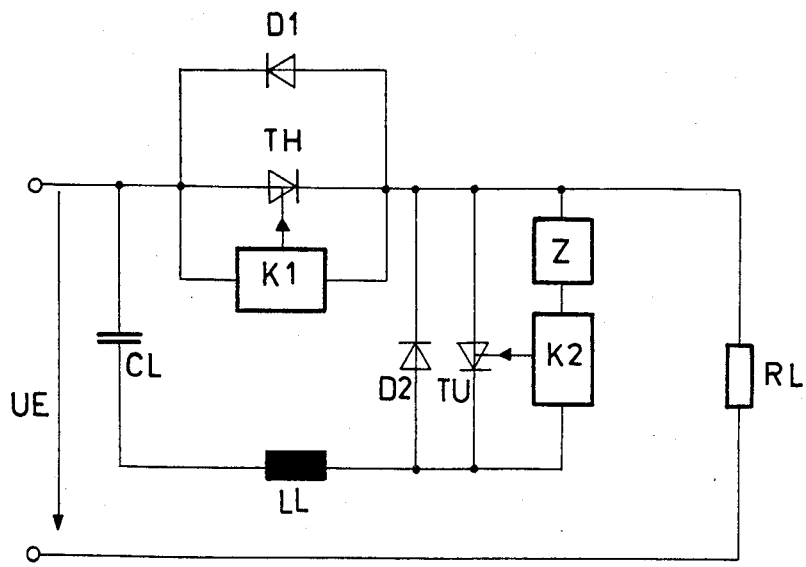
FIG. 1 shows the basic configuration of the circuit according to the invention.

Referring now to the drawings, wherein like reference numerals designate identical or corresponding parts, and more particularly to FIG. 1 thereof, there is shown the basic configuration of the electronic chopper circuit according to the invention. A load resistance RL is connected via a main thyristor TH, which is arranged in the forward direction and is provided with an anti-parallel quenching diode D1, to the input of the circuit, to which the input voltage UE to be limited is applied. In parallel with the main thyristor TH a first breakover circuit K1 is connected, which senses the voltage dropped across the main thyristor TH with two inputs and supplies, via one output, a firing pulse to the control input of the main thyristor TH when this voltage has exceeded a fixed value. Also in parallel with TH a quenching circuit is arranged, which consists of a series tuned circuit with a quenching capacitor CL and a quenching inductance LL and is generated by the anti-parallel combination of a charging diode D2 and a quenching thyristor TU. Similarly to the main thyristor TH, the quenching thyristor TU is also fired by the output pulse of a second breakover circuit K2 which, together with a timing section Z, is controlled by the voltage dropped across the quenching thyristor TU.

The functional process can be seen directly from the circuit arrangement. In normal operation, when the input voltage UE does not exceed the value fixed by the first breakover circuit K1 and therefore does not need to be limited, the main thyristor TH is cut off so that the full input voltage UE is dropped across it. In normal operation, the quenching capacitor CL can therefore charge up via the charging diode D2 to a voltage which is adequate for quenching.

As soon as the input voltage UE exceeds the response threshold of the first breakover circuit K1, the main thyristor fires, so that the over-voltage at the input can be reduced by a current flowing through the load resistance RL. Simultaneously with the firing of the main thyristor, the voltage at the quenching thyristor TU jumps to the value of CL. Delayed by a certain period of time by the timing section Z, this voltage jump is passed on to the second breakover circuit K2, the response threshold of which is thus exceeded. This leads to the firing of the quenching thyristor, which initiates an oscillatory process in the series tuned circuit consisting of quenching capacitor CL and quenching inductance LL. CL is recharged via the quenching thyristor TU but it swings back via the charging diode D2 and the quenching diode D1 and effects a zero transition of the current in the main thyristor TH and thus quenches it. Overall, a current pulse is produced through the load resistance RL which has a duration which is fixed by the internal time constant of the timing section Z.

As soon as the main thyristor TH has regained its capacity for being cut off, after the end of the quenching process, the first breakover circuit is again across the full input voltage UE. If the over-voltage has not been completely eliminated by the one current pulse, the conducting cycle described begins again and causes a further current pulse to flow through the load resistance RL. In this manner, a sequence of conducting cycles is run through and current pulses are delivered until the over-voltage at the input has been eliminated.

The particular advantage of the circuit according to the invention is that it can be built up in a completed fashion without external control. This is of importance especially in those operational cases in which the over-voltage to be limited is caused by interference in the total system. Since the circuit is autonomous, it is not adversely affected in its function by such interference but reacts exclusively in accordance with the voltage UE applied to the input. This results in a limiter circuit which has high functional reliability and efficiency with these improved properties being brought about by using only a few components.

Figure 2:
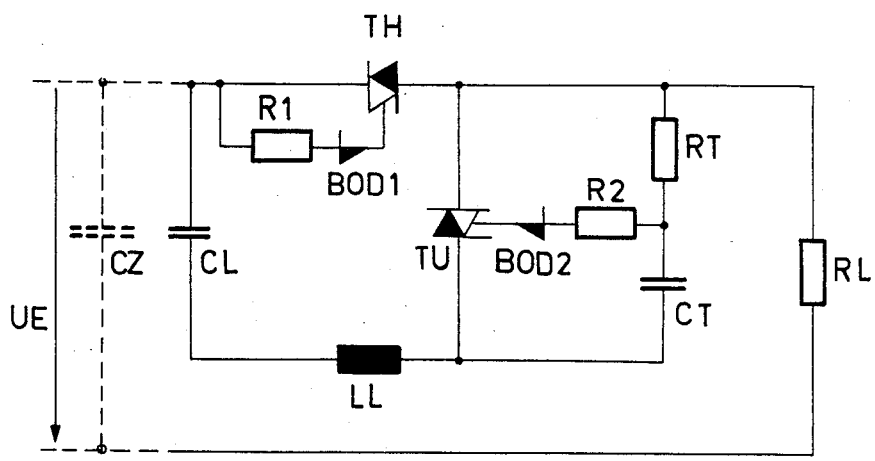
FIG. 2 shows a preferred illustrative embodiment of the circuit according to FIG. 1.

Special significance is accorded to the breakover circuits K1 and K2 which are responsible for the autonomous control of the thyristors TH and TU. In a preferred illustrative embodiment, such as is shown in FIG. 2, th breakover circuits consist of breakover diodes BOD1 and BOD2 and the appropriate current-limiting series resistances R1 and R2. In the case of the main thyristor TH, the breakover branch, consisting of series resistance R1 and breakover diode BOD1, is connected directly between the anode and the gate. In the case of the quenching thyristor TU, R2 and BOD2 are connected between the gate and the centre tap of the timing section Z, which is composed of a timing capacitor CT and a timing or load resistance RT.

The breakover voltage of the first breakover diode BOD1 directly determines the response voltage of the chopper circuit. As soon as this voltage value is exceeded by the input voltage UE, the controlled breakdown starts in the breakover diode and fires the main thyristor TH. The voltage jump, already described, across the quenching thyristor TU which immediately follows the firing of TH, also appears across the timing section Z. The voltage $U_{CT}$ across the timing capacitor increases exponentially with time t to the voltage $U_{TU}$ across the quenching thyristor in accordance with the equation $$U_{CT} = U_{TU} \times (1 - \exp(-t/R_{RT} \times C_{CT}))$$

The time constant for this process is calculated in the conventional manner from the product of the value of the resistance $R_{RT}$ and the capacitance $C_{CT}$ of the timing section. The breakover voltage of the second breakover diode BOD2 is selected in such a manner that it is exceeded in finite time by the voltage $U_{CT}$ across the timing capacitor CT. If this condition is met, controlled breakdown will occur also in this instance and will fire the quenching thyristor TU and thus initiate the quenching process which has already been described.

The circuit can be further simplified and improved in its switching characteristics if so-called reverse conducting thyristors (RLT) are used as the thyristors, as can be seen from FIG. 2. The charging diode D2 and quenching thyristor TU and the quenching diode D1 and main thyristor TH are then in each case combined in one component. In addition, reverse conducting thyristors have better electrical characteristics.

The operation of a chopper circuit according to FIG. 2 has been successfully tested, a first breakover diode BOD1 with a response or breakover voltage of 800 V and a second breakover diode BOD2 with a breakover voltage of 450 V being used. The magnitude of the current pulse in the conducting phase was 200 A in this case.

The chopper circuit according to the invention is suitable as a general low-maintenance over-voltage protection with high power capacity. In particular, it can be used in traction and industrial applications as over-voltage protection and also as a brake regulator in the intermediate circuit of inverters with an impressed voltage, or, as shown with broken lines in FIG. 2, at the intermediate circuit capacitor CZ in the input circuit of direct-current chopper converters. Its special advantages arise from the autonomous operation without external control or supply and from the simple and interference-proof construction from well-tested power semiconductors.

I claim:

1. An electronic chopper circuit comprising:
   a main thyristor connected to receive an input voltage;
   a quenching diode connected antiparallel with said main thyristor;
   a load resistance connected in series with said main thyristor;
   a quenching circuit including a quenching capacitor, a quenching inductance and an antiparallel combination of a charging diode and a quenching thyristor wherein said quenching circuit is connected in parallel with said main thyristor;
   a first breakover circuit comprising a first breakover diode and a first series resistance wherein said first breakover circuit is connected in parallel with said main thyristor and has an output connected to the gate of said main thyristor;
   a timing means comprising a series circuit having a timing resistance and a timing capacitor; and
   a second breakover circuit comprising a second breakover diode and a second series resistance wherein said second breakover diode is connected in series with said timing means and wherein said timing means and said second breakover circuit are connected in parallel with said quenching thyristor and wherein said second breakover circuit has an output which is connected to the gate of said quenching thyristor.

2. An electronic chopper circuit according to claim 1 further comprising:
   a first reverse conducting thyristor including said charging diode and said quenching thyristor.

3. An electronic chopper circuit according to claim 2 further comprising:
   a second reverse conducting thyristor including said quenching diode and said main thyristor.

4. A method for operating an electronic chopper circuit in which a load resistance is connected through a main thyristor to an input voltage and in which an antiparallel quenching diode is connected to said main thyristor with said main thyristor being in parallel with a quenching circuit including a quenching capacitor, a quenching inductance and an antiparallel combination of a charging diode and a quenching thyristor with a first breakover circuit being connected in parallel with said main thyristor and a second breakover circuit provided with a timing section and with said second breakover circuit being connected in parallel with said quenching thyristor and with an output of the first breakover circuit connected to the gate of the main thyristor and an output of the second breakover circuit connected to the gate of the quenching thyristor, comprising the steps of:

firing said main thyristor by means of said first breakover circuit when a predetermined value of the input voltage is exceeded;

firing said quenching thyristor by means of said second breakover circuit after a predetermined period of time determined by a said timing section whereby said main thyristor is quenched by swinging-over of said quenching capacitor.

\* \* \* \* \*